(12) United States Patent
Schuck et al.

(10) Patent No.: US 8,794,764 B2
(45) Date of Patent: *Aug. 5, 2014

(54) STEREOSCOPIC PROJECTION SYSTEM EMPLOYING SPATIAL MULTIPLEXING AT AN INTERMEDIATE IMAGE PLANE

(71) Applicant: RealD Inc., Beverly Hills, CA (US)

(72) Inventors: Miller H. Schuck, Erie, CO (US); Michael G. Robinson, Boulder, CO (US); Douglas J. McKnight, Boulder, CO (US); Gary D. Sharp, Boulder, CO (US)

(73) Assignee: RealD Inc., Beverly Hills, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/850,261

(22) Filed: Mar. 25, 2013

(65) Prior Publication Data

US 2013/0222709 A1    Aug. 29, 2013

Related U.S. Application Data

(63) Continuation of application No. 12/826,332, filed on Jun. 29, 2010, now Pat. No. 8,403,488.

(60) Provisional application No. 61/221,482, filed on Jun. 29, 2009, provisional application No. 61/221,516, filed on Jun. 29, 2009, provisional application No. 61/224,416, filed on Jul. 9, 2009, provisional application No. 61/249,018, filed on Oct. 6, 2009, provisional application No. 61/256,854, filed on Oct. 30, 2009.

(51) Int. Cl.
*G03B 21/00* (2006.01)

(52) U.S. Cl.
USPC .......... 353/7; 353/8; 353/20; 353/37; 353/38; 353/98; 349/5; 349/9

(58) Field of Classification Search
USPC ......... 353/7–9, 20, 31–34, 37–38, 81, 98–99; 359/462, 464, 465, 466, 476, 477; 349/5–9

See application file for complete search history.

(56) References Cited

U.S. PATENT DOCUMENTS

| 2,513,176 A | 6/1950 | Homrighous |
| 3,825,328 A | 7/1974 | Hoch |

(Continued)

FOREIGN PATENT DOCUMENTS

| EP | 1337117 | 8/2003 |
| GB | 2317524 | 3/1998 |

(Continued)

OTHER PUBLICATIONS

Lipton, L. "Foundations of the Stereoscopic Cinema," Van Nostrand-Reinhold, Appendix 7, p. 260, 1982.

(Continued)

*Primary Examiner* — Sultan Chowdhury
(74) *Attorney, Agent, or Firm* — Neil G. J. Mothew; Darlene K. Kondo

(57) ABSTRACT

Projection systems and methods for providing stereoscopic images viewed through passive polarizing eyewear. The systems relate to projectors that create left and right eye images simultaneously and often as side-by-side images on the image modulator. The systems act to superimpose the spatially separated images on a projection screen with alternate polarization states. The embodiments are best suited to liquid crystal polarization based projection systems and use advanced polarization control.

36 Claims, 15 Drawing Sheets

(56) References Cited

U.S. PATENT DOCUMENTS

| | | | |
|---|---|---|---|
| 3,943,344 | A | 3/1976 | Kidode et al. |
| 4,464,028 | A | 8/1984 | Condon |
| 4,915,497 | A | 4/1990 | Loth et al. |
| 5,481,321 | A | 1/1996 | Lipton |
| 5,715,029 | A | 2/1998 | Fergason |
| 5,716,122 | A | 2/1998 | Esaki et al. |
| 5,751,384 | A | 5/1998 | Sharp |
| 5,930,050 | A | 7/1999 | Dewald |
| 5,953,083 | A | 9/1999 | Sharp |
| 5,975,703 | A * | 11/1999 | Holman et al. ............ 353/20 |
| 6,067,128 | A | 5/2000 | Imai |
| 6,429,906 | B1 | 8/2002 | Sekine et al. |
| 6,513,934 | B1 | 2/2003 | Okuyama |
| 6,603,876 | B1 | 8/2003 | Matsuo et al. |
| 6,995,920 | B2 | 2/2006 | Nurishi |
| 7,059,728 | B2 | 6/2006 | Alasaarela et al. |
| 7,330,298 | B2 | 2/2008 | Bommersbach et al. |
| 7,458,687 | B2 * | 12/2008 | Silverstein et al. ............ 353/20 |
| 7,606,485 | B2 | 10/2009 | Ohashi |
| 2001/0021004 | A1 | 9/2001 | Yano |
| 2001/0043395 | A1 * | 11/2001 | Costales ............... 359/464 |
| 2002/0005820 | A1 | 1/2002 | Son |
| 2002/0191235 | A1 | 12/2002 | O'Connor et al. |
| 2003/0197933 | A1 | 10/2003 | Sudo et al. |
| 2004/0212882 | A1 | 10/2004 | Liang et al. |
| 2006/0033992 | A1 | 2/2006 | Solomon |
| 2006/0087734 | A1 | 4/2006 | Weissman |
| 2006/0109753 | A1 | 5/2006 | Fergason |
| 2006/0114415 | A1 | 6/2006 | Shestak et al. |
| 2007/0132953 | A1 | 6/2007 | Silverstein |
| 2007/0273761 | A1 | 11/2007 | Maruyama et al. |
| 2007/0273798 | A1 | 11/2007 | Silverstein et al. |
| 2008/0018861 | A1 | 1/2008 | Schuck et al. |
| 2008/0117493 | A1 | 5/2008 | Penn |
| 2009/0086016 | A1 | 4/2009 | Su |
| 2009/0128780 | A1 | 5/2009 | Schuck |
| 2010/0002154 | A1 | 1/2010 | Hua |
| 2010/0328560 | A1 | 12/2010 | Tanaka |

FOREIGN PATENT DOCUMENTS

| | | |
|---|---|---|
| WO | 2006038744 | 4/2006 |
| WO | 2008141247 | 11/2008 |

OTHER PUBLICATIONS

Smith, W. Modern Optical Engineering, p. 272, McGraw-Hill 1990.

International search report and written opinion of the international searching authority international patent application No. PCT/US10/040429 dated Feb. 10, 2011.

International search report and written opinion of the international searching authority in international patent application No. PCT/US09/66292 dated Jul. 20, 2010.

* cited by examiner

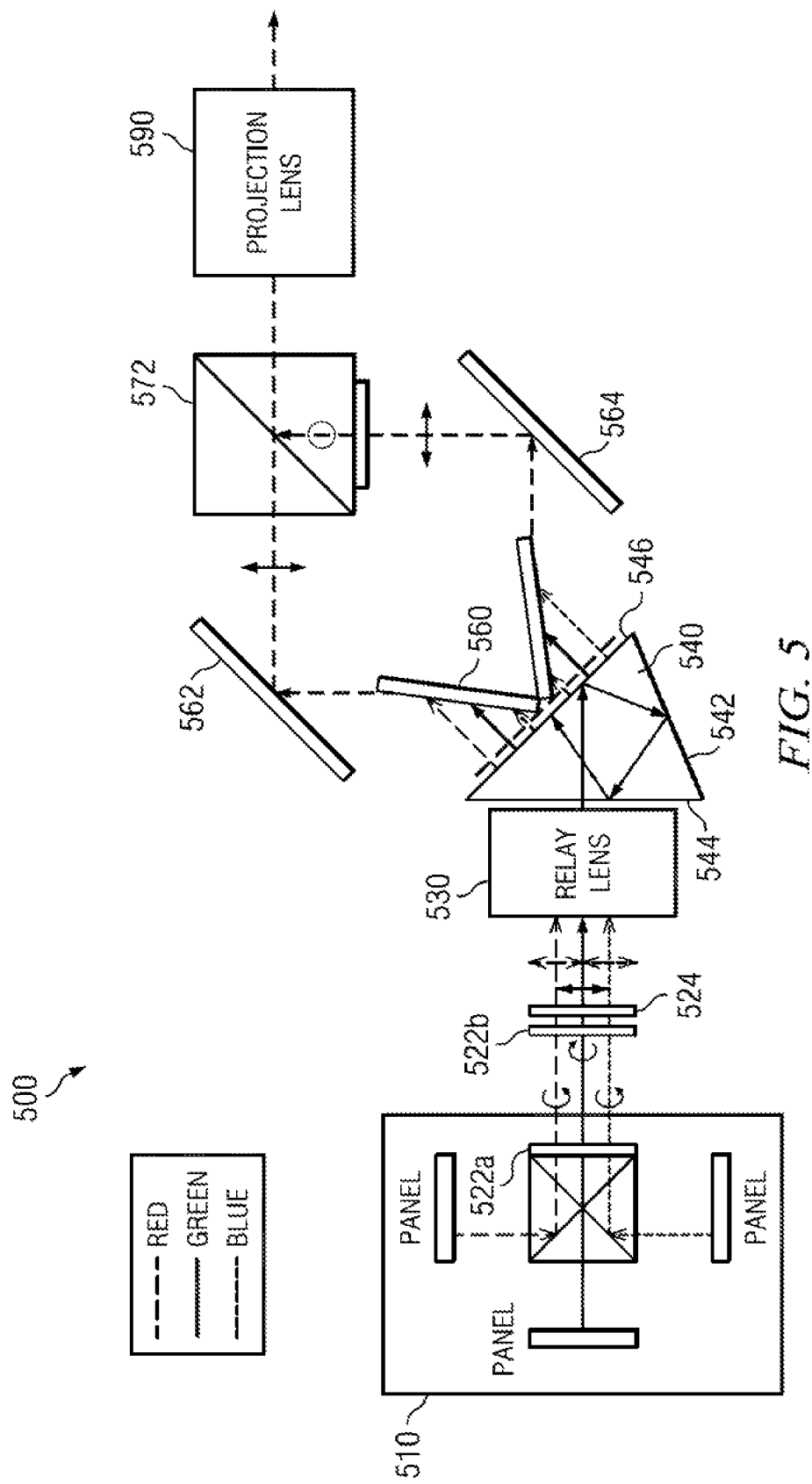

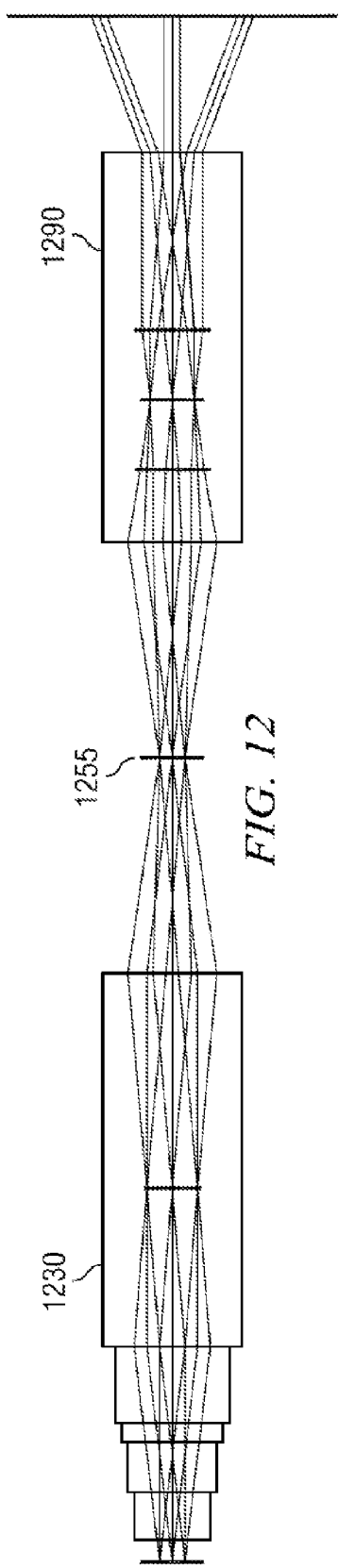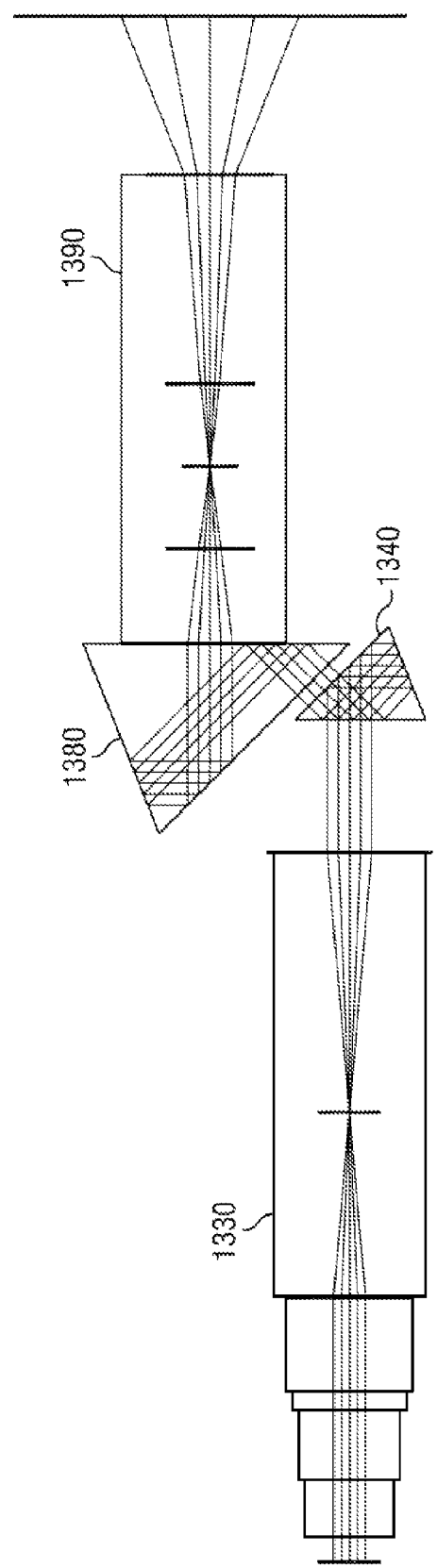

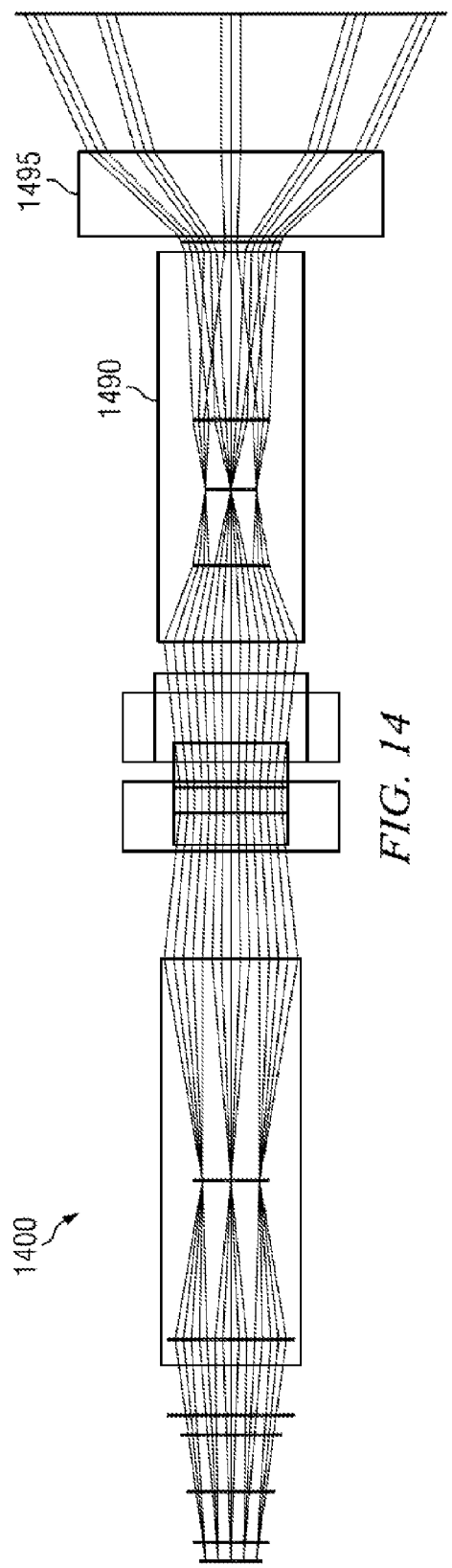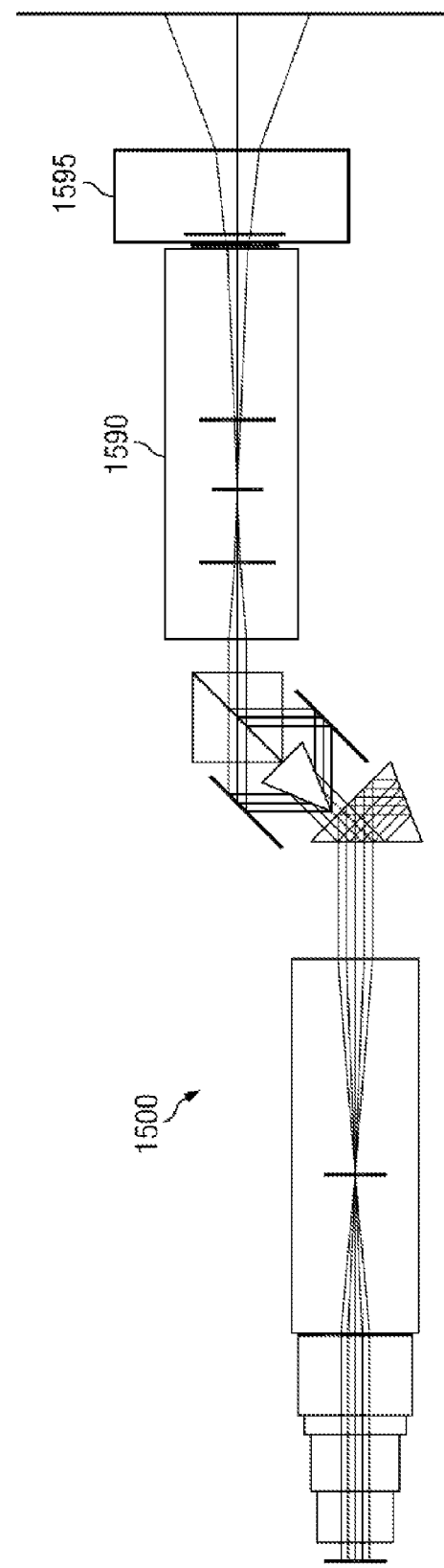

STEREOSCOPIC PROJECTION SYSTEM EMPLOYING SPATIAL MULTIPLEXING AT AN INTERMEDIATE IMAGE PLANE

CROSS REFERENCE TO RELATED APPLICATIONS

This is a continuation patent application and claims priority to U.S. patent application Ser. No. 12/826,332, entitled "Stereoscopic projection system employing spatial multiplexing at an intermediate image plane," to Schuck et al., filed Jun. 29, 2010 that relates to and claims priority of:

(1) provisional patent application Ser. No. 61/221,482, entitled "Stereoscopic Projection System Employing Spatial Multiplexing at an Intermediate Image Plane," to Robinson et al., filed Jun. 29, 2009 ("Robinson et al. Prov. Pat. App.");

(2) provisional patent application Ser. No. 61/221,516, entitled, "Stereoscopic Projection System Employing Spatial Multiplexing Near the Aperture Stop," to Schuck et al., filed Jun. 29, 2009;

(3) provisional patent application Ser. No. 61/224,416, entitled "Stereoscopic Projection System Employing Spatial Multiplexing at an Intermediate Image Plane," to Schuck et al, filed Jul. 9, 2009 ("Schuck et al. Prov. Pat. App.");

(4) provisional patent application Ser. No. 61/249,018, entitled, "Stereoscopic projection system employing spatial multiplexing at an intermediate image plane," to Schuck et al., filed Oct. 6, 2009; and (5) provisional patent application Ser. No. 61/256,854, entitled, "Stereoscopic projection system employing spatial multiplexing at an intermediate image plane," to Schuck et al., filed Oct. 30, 2009;

all of which are herein incorporated by reference for all purposes.

TECHNICAL FIELD

The disclosed embodiments generally relate to projection systems and, more specifically, relate to projection systems that may selectively operate in a stereoscopic mode and a non-stereoscopic mode.

BACKGROUND

Stereoscopic projection dates back to the early $20^{th}$ century and was first seen in cinemas during the 1950s. These systems were film based and were limited mechanically to modest ~24 Hz frame rate. As such, it was not possible to use temporal methods of providing flicker-free sequential left and right eye images for stereoscopy. Spatially multiplexed image display systems were therefore implemented. Some comprised separate projectors while others employed a single projector with each frame comprising spatially separate left and right eye images. Complex frame dividing optics was used in this latter case to successfully superimpose the images on the screen. Many systems were developed and several commercially successful, as discussed by L. Lipton in Foundations of the Stereoscopic Cinema, Van Nostrand-Reinhold, Appendix 7, p. 260, 1982, which is hereby incorporated by reference. Unfortunately the quality of the stereoscopic experience was insufficient to draw customers leading to a reversal to 2D cinema in the latter half of the century.

Stereoscopic projection has recently been revitalized with high quality advanced digital equipment encompassing capture, distribution and display. To date the most successful projection system has been developed and installed by RealD. Based on Texas instruments Digital Light Processing (DLP) technology, systems provide time sequential left and right eye images at flicker free rates. Incorporating a polarization switch in the projection path provides sequential left and right eye images for viewing through passive polarizing eyewear. While the system based on DLP technology may provide good quality stereoscopic imagery, alternative projection platforms, such as those based on liquid crystal (LC) modulation, can also be considered. Desirable features of an LC projector-based platform are potentially providing improved resolution, motion rendition, and optical polarization efficiencies. Presently, a single LC projector does not however provide time-sequential images with sufficient frame rate to allow temporal left eye/right eye polarization modulation.

SUMMARY

Disclosed are stereoscopic projection systems and methods for stereoscopic projection.

Generally, according to an aspect, a projection system is operable to selectively project stereoscopic and non-stereoscopic projection modes. The projection system includes a relay lens subsystem, a stereoscopic module, a non-stereoscopic module, and a projection lens subsystem. The relay lens subsystem is operable to receive input light from the projection subsystem and convey the input light toward an intermediate light path. The stereoscopic module is operable to receive the light from the intermediate light path and process the light for stereoscopic projection of left and right eye images having orthogonal polarization states. The non-stereoscopic module is operable to receive the light from the intermediate light path. The projection lens subsystem is operable to focus light from the stereoscopic module or the non-stereoscopic module toward a screen. When the projection system is in a stereoscopic projection mode, the stereoscopic module is located in the intermediate light path, and when the projection system is in a non-stereoscopic projection mode, the non-stereoscopic module is located in the intermediate light path.

Generally, according to another aspect, the stereoscopic projection systems may include a relay lens subsystem, a light splitting subsystem, a light combining subsystem, and a projection lens subsystem. The relay lens subsystem is operable to receive a stereoscopic image frame from an input light path and convey the stereoscopic image frame to an intermediate image plane via a light directing element. The stereoscopic image frame has first image area light and second image area light. The light splitting subsystem is operable to receive the stereoscopic image frame at the intermediate image plane and split the first image area light from the second image area light. The light splitting subsystem is also operable to direct the first image area light on a first image light path, and to direct the second image area light on a second image light path. The light combining subsystem is operable to combine the first and second image area light, wherein the first image area light that is output from the light combining subsystem has a polarization state orthogonal to the second image area light. The projection lens subsystem is operable to direct the first and second image area light toward a screen.

Other aspects, features and methods of stereoscopic and non-stereoscopic projection are apparent from the detailed description, the accompanying figures and the appended claims.

BRIEF DESCRIPTION OF THE DRAWINGS

FIG. 5 is a schematic diagram illustrating another embodiment of a stereoscopic projection system, in accordance with the present disclosure;

FIG. 12 is a schematic ray trace diagram illustrating a technique for converting a spatially multiplexed 3D projection system to a non-multiplexed full resolution 2D system, in accordance with the present disclosure;

FIG. 13 is a schematic ray trace diagram illustrating another example of a technique for converting the optical system from 3D mode to 2D full resolution mode, in accordance with the present disclosure;

FIG. 14 is a schematic diagram illustrating an embodiment of a system with an external anamorphic converter lens located in the light path after the projection lens, in accordance with the present disclosure;

FIG. 15 is a schematic diagram illustrating another embodiment of a system with an external anamorphic converter lens, in accordance with the present disclosure;

DETAILED DESCRIPTION

Figure 1A:
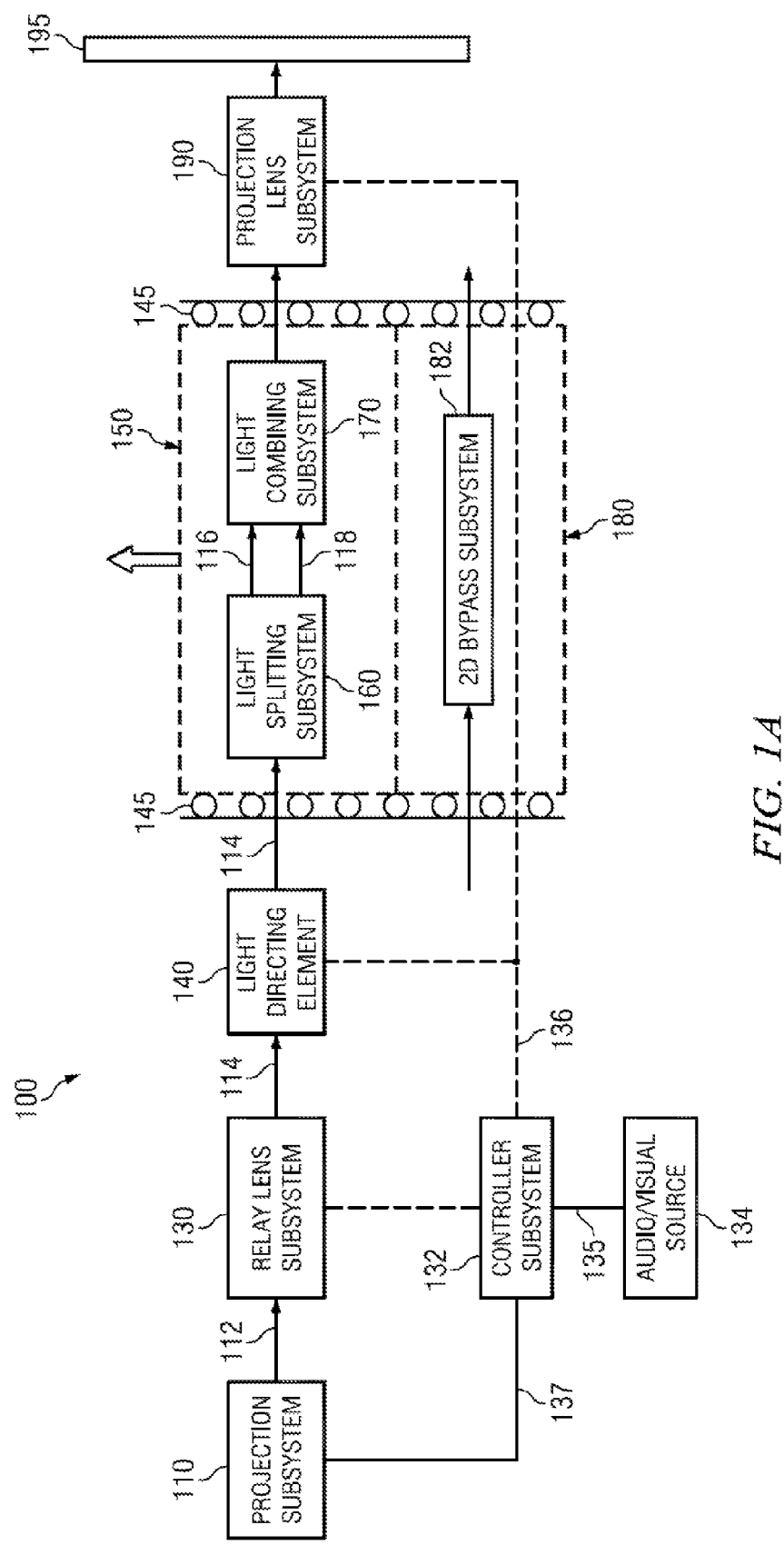
FIG. 1A is a schematic block diagram of an exemplary projection system in a stereoscopic projection mode, in accordance with the present disclosure.
Figure 1B:
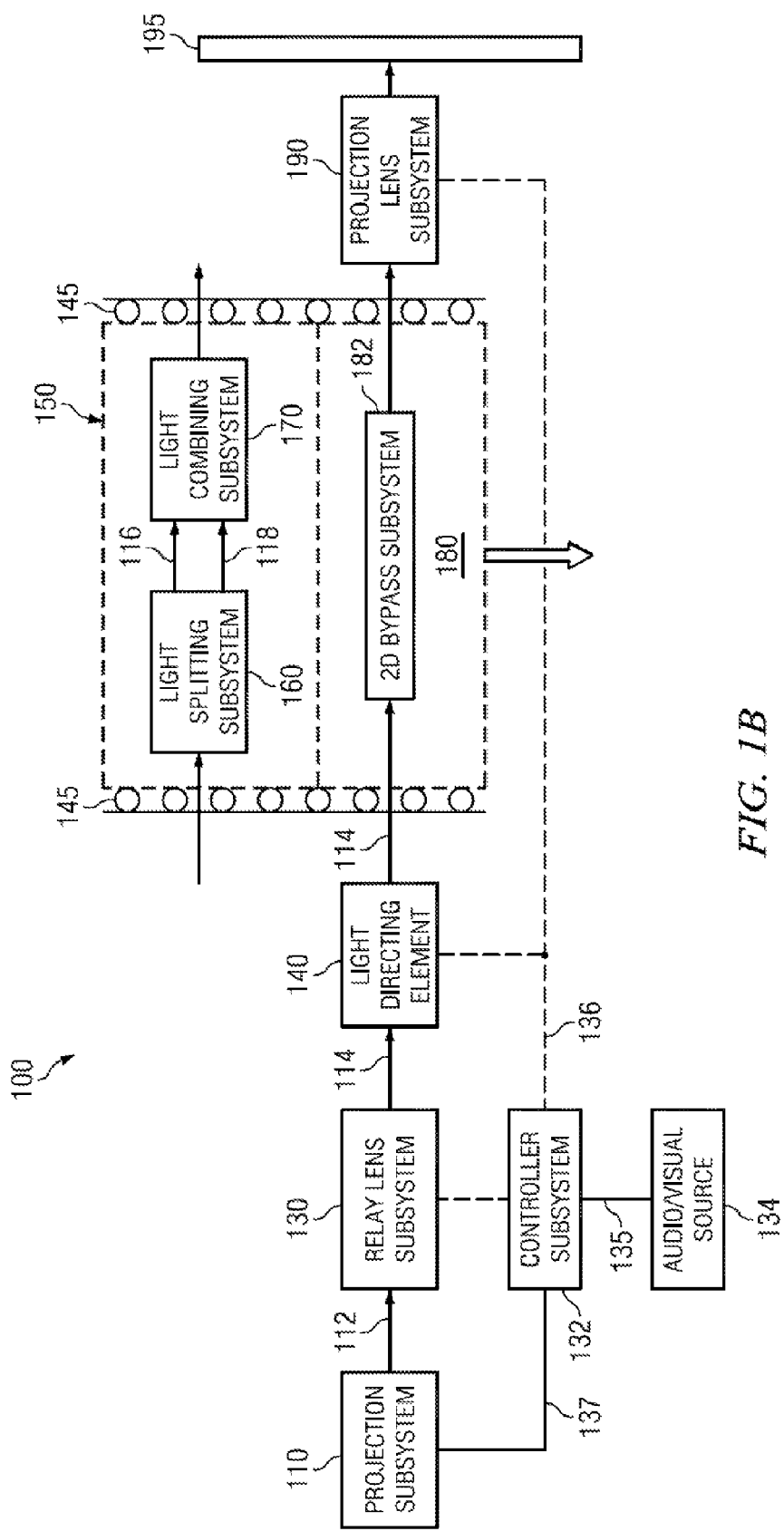
FIG. 1B is a schematic block diagram of an exemplary projection system in a non-stereoscopic projection mode, in accordance with the present disclosure.

FIG. 1A is a schematic block diagram of an exemplary projection system 100 in a stereoscopic projection mode, and FIG. 1B is a schematic block diagram of an exemplary projection system 100 in a non-stereoscopic projection mode. FIGS. 1A and 1B illustrate the principle that a stereoscopic module 150 or a non-stereoscopic module 180 may be selectively placed in a light path from a projector. A mechanical assembly 145 may contain both the stereoscopic module 150 and the nonstereoscopic module 180, which may selectively slide back and forth between the stereoscopic mode and the nonstereoscopic mode according to whether the media type is stereoscopic imagery or not. Such a configuration may have practical application in cinematic environments, as well as home and office environments, requiring minimal technical skill from an operator to place in the stereoscopic or a non-stereoscopic mode.

The exemplary projection system 100 includes a relay lens subsystem 130, optional light directing element 140, stereoscopic module 150, non-stereoscopic module 180, and projection lens subsystem 190. Stereoscopic module 150 may include a light splitting subsystem 160 and a light combining subsystem 170. Non-stereoscopic module 180 may include a 2D bypass subsystem 182, which may have an optical path length similar to the stereoscopic module 150. In an embodiment, the stereoscopic projection system 100 may also include an audio visual source 134, a controller subsystem 132, and a projection subsystem 110. The projection subsystem 110 may include, but is not limited to, an LC projection system or a DLP projection system.

Although an exemplary multi-mode stereoscopic/nonstereoscopic system is shown herein, it should be apparent that this disclosure is not limited to a multi-mode system. For example, the exemplary stereoscopic projection system architecture shown herein may be applied to a stereoscopic-only projection system that omits the nonstereoscopic module 180.

Referring to FIG. 1A, in a stereoscopic mode of operation, the audio visual source 134 provides an audio visual signal 135 to the stereoscopic projection system 100. The controller subsystem 132 may transmit a stereoscopic video signal 137 to the projection subsystem 110. The projection subsystem 110 projects an image pair at the input light path 112. The relay lens subsystem 130 receives the input light path 112 and outputs intermediate light 114. An optional light directing element 140 may direct the intermediate light 114 toward the light splitting subsystem 160 in the stereoscopic module 150. The light splitting subsystem 160 receives the intermediate light path 114 and outputs light on a first image light path 116 and on a second image light path 118. The light combining subsystem combines the light from first and second image light paths 116, 118 and directs substantially overlapping first and second image light having orthogonal polarization states toward the projection lens subsystem 190, which is focused on a screen 195. Various different optical architectures are presented herein illustrating exemplary stereoscopic modules.

Referring to FIG. 1B, illustrating a nonstereoscopic mode of operation, the non-stereoscopic module 180 may be placed in the light path from the light directing element 140, thus the 2D bypass subsystem 182 directs the intermediate light path 114 toward the projection lens subsystem 190. Various different optical architectures are presented herein illustrating exemplary non-stereoscopic modules.

In an embodiment, common to both modes of operation, controller subsystem 132 receives the audio visual signal 135 and outputs a control signal 136. The controller subsystem 132 may be operatively coupled to the various subsystems, as shown. Controller subsystem 132 is operable to send control signals and receive feedback signals from any one of the various operatively coupled subsystems to adjust their respective optical characteristics. The controller subsystem 132 may take input from sensors, from the audio visual source 134, and/or from user input to make adjustments (e.g., to focus or calibrate the stereoscopic projection equipment on screen 195). The controller subsystem 132 may also control and/or drive an actuator 145 that moves the stereoscopic/non-stereoscopic modules 150/180 between stereoscopic and non-stereoscopic configuration modes. Such an actuator 145 may be a precise driving mechanism known to those of ordinary skill in the art, such as a stepper motor, and the like.

In another embodiment, the system 100 is a passive system and does not include active switching/control components. Thus, in such an embodiment, the system 100 does not include a control signal 136.

The relay lens subsystems (e.g., 130 in FIG. 1, et cetera) disclosed herein are assumed to be polarization-preserving and are operable to work in parallel with the projection lens subsystem (e.g., 190 in FIG. 1, et cetera) to provide approximately panel-sized intermediate images at a modest distance from the lens output. Although the relay lens subsystem is assumed to be a black box for all embodiments and its design is not specific to the disclosures herein, examples of relay systems may be found in commonly-assigned patent application Ser. No. 12/118,640, entitled "Polarization conversion system and method for stereoscopic projection," filed May 9, 2008, which is herein incorporated by reference. In a similar manner, the projection optics used to relay the intermediate images onto the screen are assumed conventional and specific designs are not provided since they are not germane to the disclosure. In some embodiments, a polarization preserving projection lens may be used. An example of a polarization preserving lens is discussed by L. Sun et al. in *Low Birefringence Lens Design for Polarization Sensitive Systems*, Proc. SPIE Vol. 6288, herein incorporated by reference.

The polarization aspects of the disclosure generally include conditioning the light for efficient splitting and encoding of output images. Electronic aspects may generally include pre-distorting the images to accommodate optical aberrations and allow anamorphic imaging techniques to preserve aspect ratio of the original panel when only half of the area is allocated to a full screen image. Generally, electronic alignment techniques may be used for on-screen image alignment. Optical aspects of the disclosure generally cover techniques of physically separating optical paths for each of the left and right eye images (e.g., the light splitting subsystem 160 in FIG. 1). In an embodiment, this splitting architecture is extended to enable superposition of the left and right eye images prior to projection.

In an embodiment, it is assumed that the projection subsystem 110 provides circular polarized light with green light having the opposite handedness to red and blue. This is typical of three panel liquid crystal projectors that use a combining X-cube. The color dependent linear polarizations emanating from this element are routinely transformed into circular polarization to avoid back reflections from the projection lens which may affect ANSI contrast. The precise allocation of left handed or right handed polarization to the odd green wavelengths is arbitrary, but may be pre-conditioned correctly. It is assumed here that effective correction may use a crossed matching retarder, as this is the case for most commercial projectors on the market. Though geared toward the mixed circular output, the system embodiments should not be limited to the precise polarization states assumed to emanate from the projector. The concepts covered here can be applied to alternative projectors (e.g., DLP, etc.) since the creation of equivalent entrance polarizations can be easily provided by available components. For instance, ColorSelect® technology may map between defined wavelength dependent polarization states, and are described in commonly-assigned U.S. Pat. No. 5,751,384, herein incorporated by reference.

Figure 2:
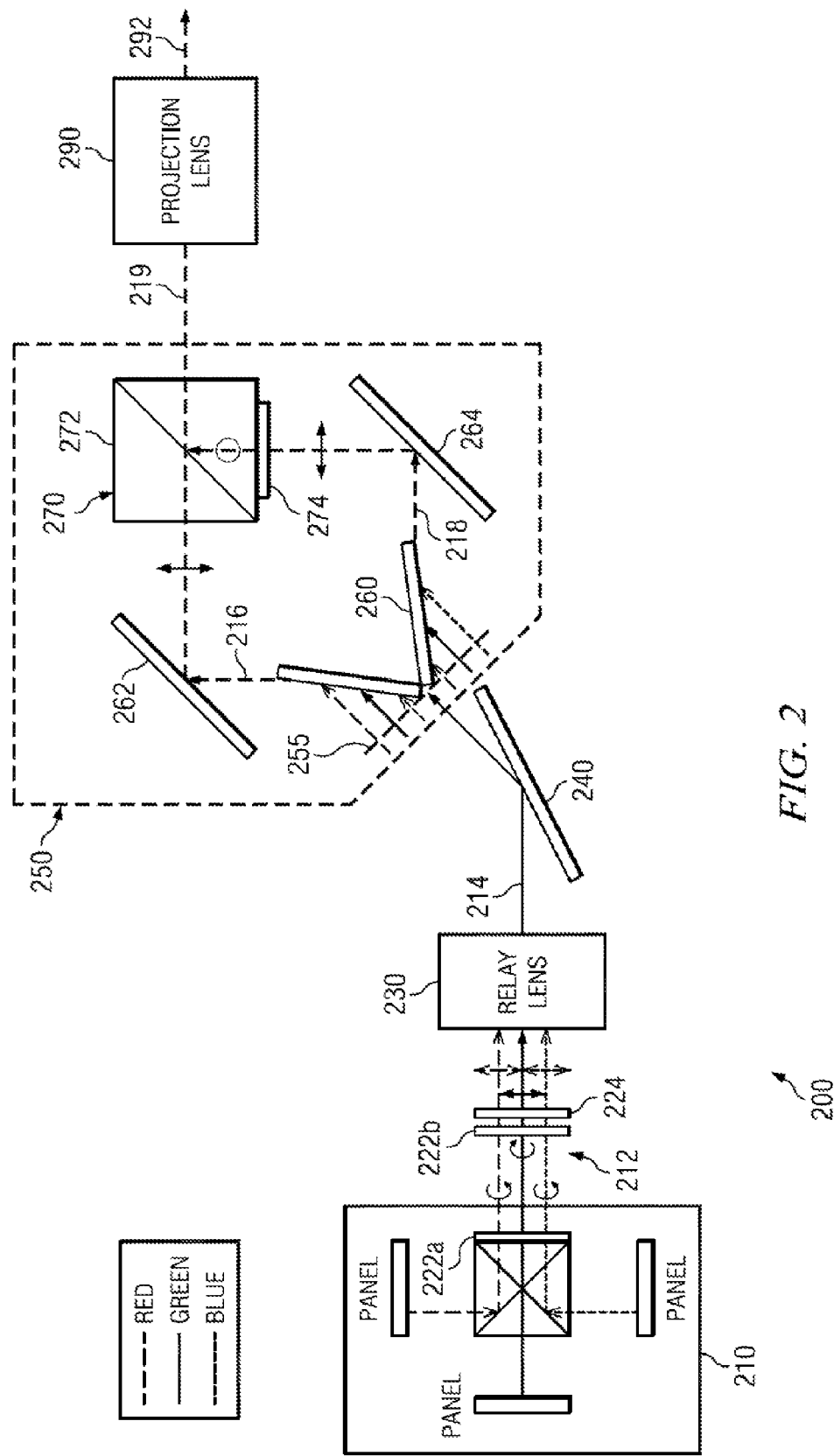
FIG. 2 is a schematic diagram of an embodiment of a stereoscopic projection system, in accordance with the present disclosure.

FIG. 2 is a schematic diagram of an embodiment of a stereoscopic projection system 200. Generally, the system 200 may include a projection subsystem 210, relay lens 230, light directing element 240, stereoscopic subsystem 250, and a projection lens 290. In this exemplary system 200, stereoscopic subsystem 250 may include light splitting subsystem 260, first and second light directing elements 262, 264, and light combining subsystem 270. Light combining subsystem 270 may include a polarization beam splitter (PBS) 272 and an achromatic rotator 242 located on an input port of PBS 272. The system 200 may also include matched waveplates 222a, 222b and, wavelength-selective polarization filter 224 (e.g., a ColorSelect filter as taught in U.S Pat. Nos. 5,751,384 and 5,953,083, herein incorporated by reference), both arranged as shown, located in the light path between projection subsystem 210 and relay lens 230. Additionally, the system may include light directing element 240 to direct light from relay lens subsystem 230 toward the stereoscopic subsystem 250.

In operation, the relay lens subsystem 230 receives light from the projection subsystem 210 at the input light path 212. In an embodiment, matched waveplates 222a, 222b and wavelength-selective polarization filter 224 are positioned on the input light path 212 between the projection subsystem 210 and the relay lens subsystem 230. Alternatively, matched waveplates 222a, 222b may be positioned between the relay lens subsystem 230 and the image splitting element 260, near the intermediate image plane 255. As another alternative, a first matched waveplate 222a is positioned between the projection subsystem 210 and the relay lens subsystem 230 (as shown) and a second matched waveplate 222b is positioned between the relay lens subsystem 230 and the light splitting element 260, near the intermediate image plane 255. The relay lens subsystem 230 outputs an intermediate light path 214 toward a light directing element 240, that directs the light 214 toward an intermediate image plane 255 at the input of the light splitting element 260. It should be noted that wherever the waveplate 222b is placed in the optical path, the wavelength selective filter 224 will follow it somewhere downstream in the following light path, before reaching the light combining subsystem 270.

Light directing element 240 is located in the light path 214 after the relay lens subsystem 230. Light directing element 240 may be a fold mirror (as shown here) or a prism. The light directing element 240 redirects the light path 214 such that the optical axis of the projection lens subsystem 290 is parallel to the optical axis of the relay lens subsystem 230. This improves system compatibility with existing projection engines and theater geometries.

The light splitting subsystem 260 may be provided by highly reflective silver mirrors that are polarization preserving or a prism with mirrored or TIR surfaces. The light splitting subsystem 260 may alternatively be provided by any other device that can split the light, for example circularly polarizing optical gratings may be used. The light splitting element 260 is operable to split the intermediate light path 214 into a first image light path 216 and a second image light path 218. In an embodiment, the first and second light directing elements 262, 264 includes first and second mirrors configured to reflect their respective first and second image light paths 216, 218 toward first and second input ports of light combining subsystem 270. The PBS 272 is operable to combine the first and second image light paths 216, 218 into a third image light path 219. The projection lens subsystem 290 receives the light on the third image light path 219 and projects output image light 292 toward a screen (not shown).

The exemplary system 200 includes superposition of oppositely polarized left- and right-eye image paths (e.g., first and second image light paths 216, 218) carried out at the interface of a PBS 272 before being projected by a single lens 290. By encoding the two images with orthogonal polarizations and directing them symmetrically into a polarizing beam splitting element 272 the two images appear to emanate from the same plane. A single polarization preserving projection lens 290 can then project the images onto a screen.

In some embodiments, the polarization rotator element 274 may introduce an optical path mismatch which may in practice be matched with dummy material at the other input port to the PBS 272.

"Wobulation" is a technical term for spatially dithering an image to increase the perceived quality of the image. Spatial dithering involves presenting an image at one instance in time, and presenting a spatially shifted image the next instance in time. The spatial shift is typically a fraction of a pixel. The images from one instance to the next may be the same (for a smoother overall image), or they may be different (for a smoother and sharper image). Methods for implementing wobulation include vibrating a mirror in the optical path (e.g., light directing element 240) in synchronization with the two instances of the images as discussed in U.S. Pat. No. 7,330,298 to Bommerbach et al, which is herein incorporated by reference for all purposes. The mirror vibration is modulated to produce an offset in one image that is generally a fraction of a pixel relative to the other image. Another method is to use birefringent materials coupled with switching liquid crystal elements to induce the image shift, as discussed in U.S. Pat. No. 5,715,029 to Fergason, which is herein incorporated by reference for all purposes.

In an embodiment, the stereoscopic projection systems discussed above are altered to include wobulation. For example, in FIG. 2, the light directing element 240 may be vibrated in synchronization with the image data to present spatially shifted images on-screen. Alternatively or additionally, an LC cell and birefringent plate may be added to the optical path prior to image splitting, to enable wobulation of both images together. An additional LC cell may be placed after the birefringent plate (prior to the PBS 272) to restore the desired orthogonal polarization states. Alternatively, the LC cells and birefringent plate may be added after image splitting (prior to the PBS 272) to enable wobulation separately for each image. Again, the additional LC cell would be used after the birefringent plate to restore the desired orthogonal polarization states prior to recombining the beams in the PBS 272.

Figure 3:
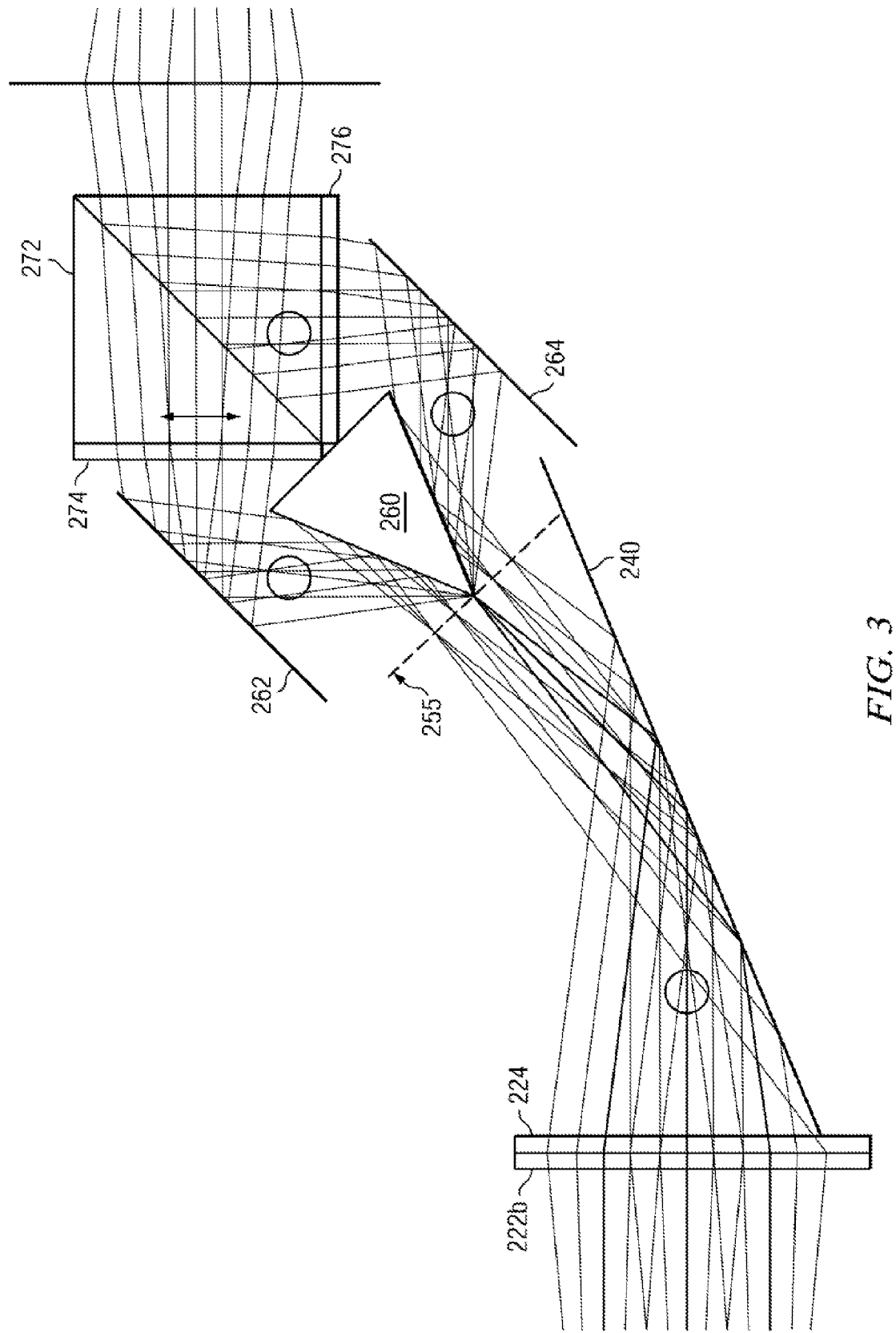
FIG. 3 is a schematic diagram of an enlarged view of the image splitting and combining section of FIG. 2.

FIG. 3 is a schematic diagram of an enlarged view of the image splitting and combining section of FIG. 2, including matched waveplate 222b, wavelength-selective filter 224, light directing element 240, light splitting subsystem (mirrored prism) 260, light directing elements 262, 264, a PBS 272, and a rotator 274 for superimposing images. In this exemplary embodiment, the matched waveplate 222b and a Green/Magenta (G/M) wavelength-selective (Colorselect) filter 224 follow the relay lens 230 in a light path to provide higher contrast by substantially removing relay lens ghost reflections. The diagram also illustrates a ray trace analysis of the system.

The light directing element (mirror) 240 is placed at an angle such that the projection lens (not shown) and relay lens optical axes are parallel. A mirrored prism 260 is placed at the intermediate image location 255 to split the two halves of the intermediate image. A mirrored prism 260 with very sharp corners (e.g., ~50 um in width) may be selected to minimize the unusable area at the intermediate image. A V-mirror arrangement (the combination of two flat mirrors) might also be utilized for the image splitting subsystem 260. Following the mirrored prism 260 are two folding mirrors 262, 264. The two folding mirrors 262, 264 redirect the rays into the entrance surfaces of the PBS 272. Prior to the PBS 272, a rotator 274 is located in one path while an isotropic plate 276 (matched in optical thickness to the rotator) is placed in other path. The rotator 274 rotates one of the incident polarization states by 90 degrees such that the two states become orthogonal. A PBS 272 combines the two orthogonal polarization states along the same optical path prior to the projection lens (not shown). The polarizing beam splitter 272 is shown as a cube polarizing beam splitter. The PBS surface can include of dielectric coating layers, or a wire grid polarizer. Additionally, the PBS may be implemented with a plate in place of the cube, where the plate is coated with appropriate dielectric layers or wire grid coating. However, in this case the beam is diverging, and thick plates will induce astigmatism in the image path which may be corrected later in the system.

Figure 4A:
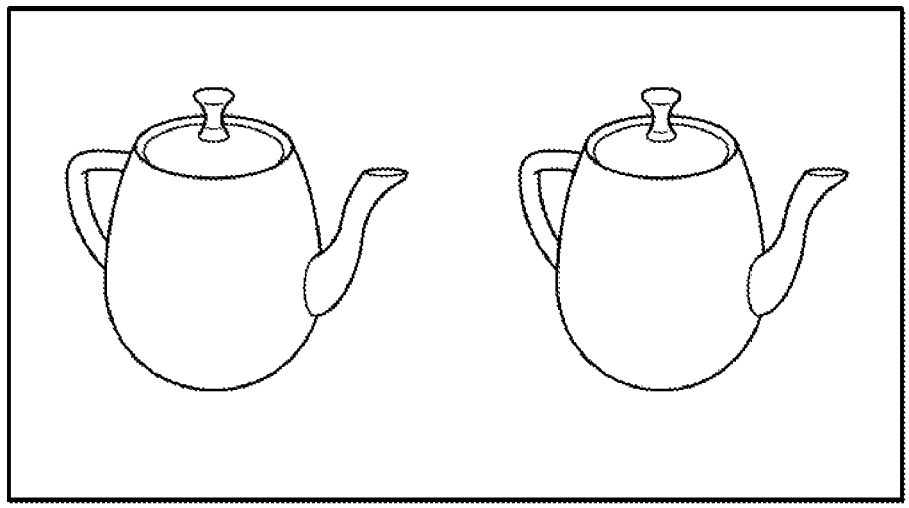
FIGS. 4A and 4B are drawings illustrating distorted side-by-side images as displayed on LC panels (4A) and anamorphic superposition on a screen (4B), in accordance with the present disclosure.
Figure 4B:
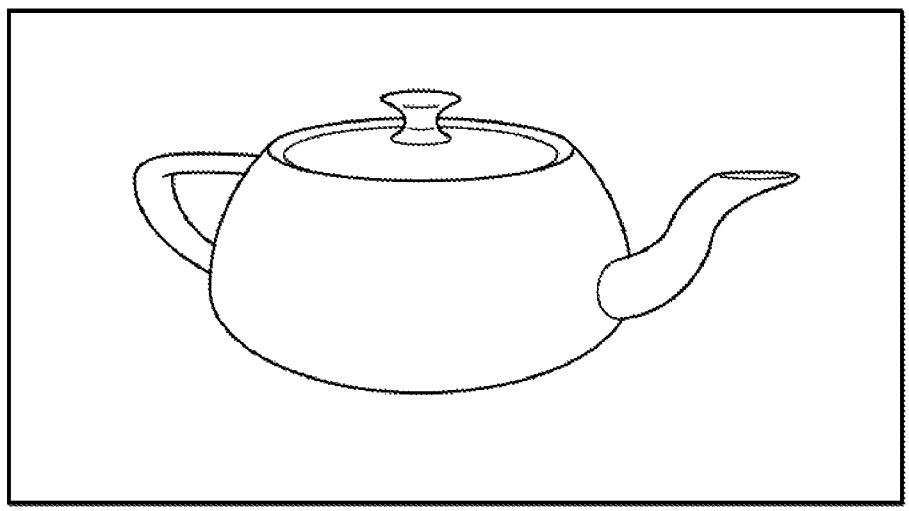

FIGS. 4A and 4B are drawings illustrating distorted side-by-side images as displayed on LC panels (4A) and their anamorphic superposition on a screen (4B). Though drawn side-by-side, this embodiment may also cover over and under formats.

Anamorphic imaging could be carried out in the relay lens subsystem to provide an intermediate image with correct aspect for each of the left or right eye images. In this case, distortion expected in the complex relay system may utilize electronic correction, or relative inversion of the paired images about the optical axis. Rotation of one of the images would then be performed with use of rotating separating prisms, as discussed by L. Lipton in *Foundations of the Stereoscopic Cinema* referenced above.

Another related embodiment uses non-ideal separating mirrors in which the geometry would dictate polarization mixing, particularly if using a total internal reflection (TIR) prism for redirecting circular polarized beams. For smaller systems, a TIR prism is preferred over mirrors for its higher reflectivity and smaller physical size. Its imparted phase delay on reflection between s and p polarization components rapidly transform polarization into a propagation dependent state. This leads in general to projected image non-uniformity that may be corrected by introducing intensity and bit depth loss. To reduce this problem to an acceptable level, linear polarization states can be created prior to entering the system. To a great extent, polarization is preserved since these states would closely resemble the s or p Eigen-states for the majority of rays present in the imaging system.

FIG. 5 is a schematic diagram of an embodiment of a stereoscopic projection system 500 in which a delta prism 540 is used as a light directing element, to provide a more compact system. Generally, the system 500 may include a projection subsystem 510, relay lens 530, and projection lens 590. The system 500 may also include matched waveplates 522a, 522b and, wavelength-selective polarization filter 524.

A delta prism 540 includes a triangular prism, with one face 542 coated with a mirror coating. Light enters a transmissive face 544, travels to the second transmissive face 546, and totally internally reflects (TIRs) at the second transmissive face 546. The reflected light then travels to the mirrored face 542, reflects, and travels to the first transmissive face 544. The light again TIRs at the input face 544 and travels to the second transmissive face 546. The angles and refractive index of the prism are designed such that the light will exit the second face 546 on this pass. In this case, the light is now incident on the light splitting subsystem 560 at 45 degrees to the optical axis of the relay lens 530, the same as in the case of the mirror system in FIG. 2. The delta prism 540 provides a more compact solution than the mirror 240 of FIG. 2. The delta prism 540 is desired to have low birefringence for efficiency and include anti-reflection coatings for the input face 544 and output face 546.

Wobulation is enabled in this exemplary embodiment by rotating the prism 540 about the optical axis of the relay lens 530. This rotation induces a shift in image location on the screen. Alternatively, wobulation of each image might be enabled by vibrating the two re-directing mirrors 562, 564 prior to the PBS 572.

Figure 6:
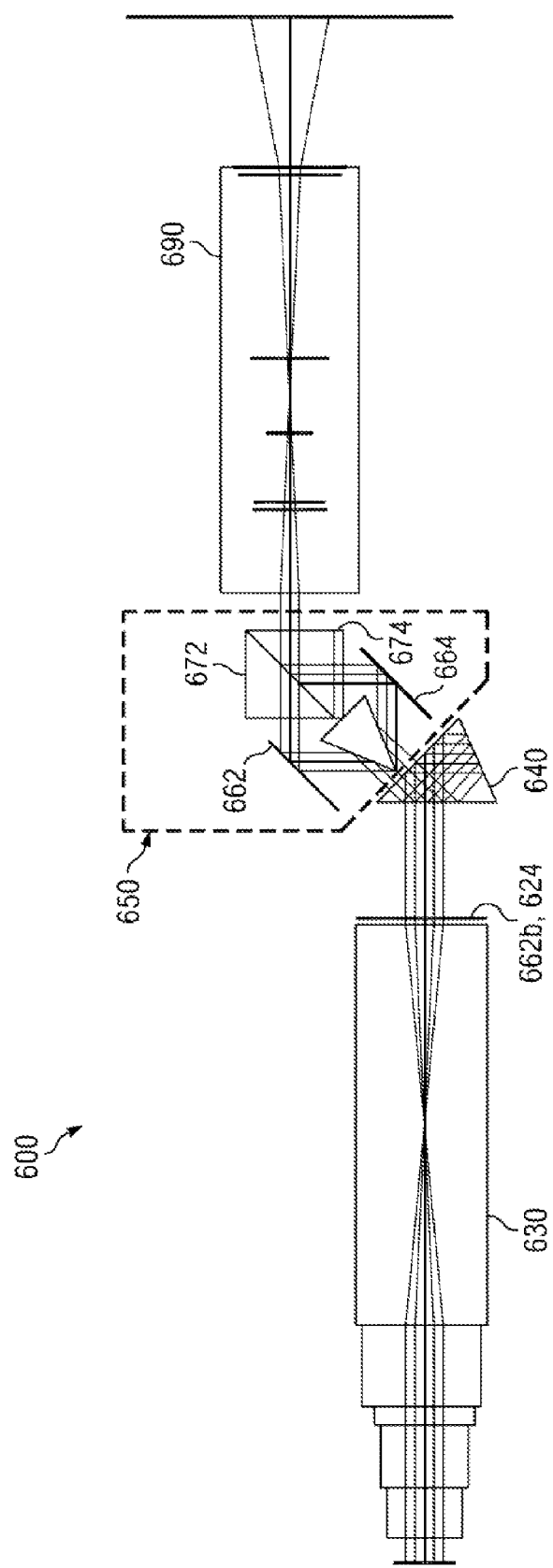
FIG. 6 is a schematic diagram illustrating another embodiment of a stereoscopic projection system, in accordance with the present disclosure.

FIG. 6 is a schematic ray tracing diagram of projection system 600 showing the relay lens subsystem 630, delta prism 640, stereoscopic subsystem 650, and projection lens subsystem 690. The stereoscopic subsystem 650 includes a mirrored splitting prism 660, re-directing mirrors 662, 664, and the PBS 672 for combining the optical paths. The matched waveplate 622*b*, wavelength-selective filter 624, and rotator 674 are also included for supporting the system operation.

Figure 7:
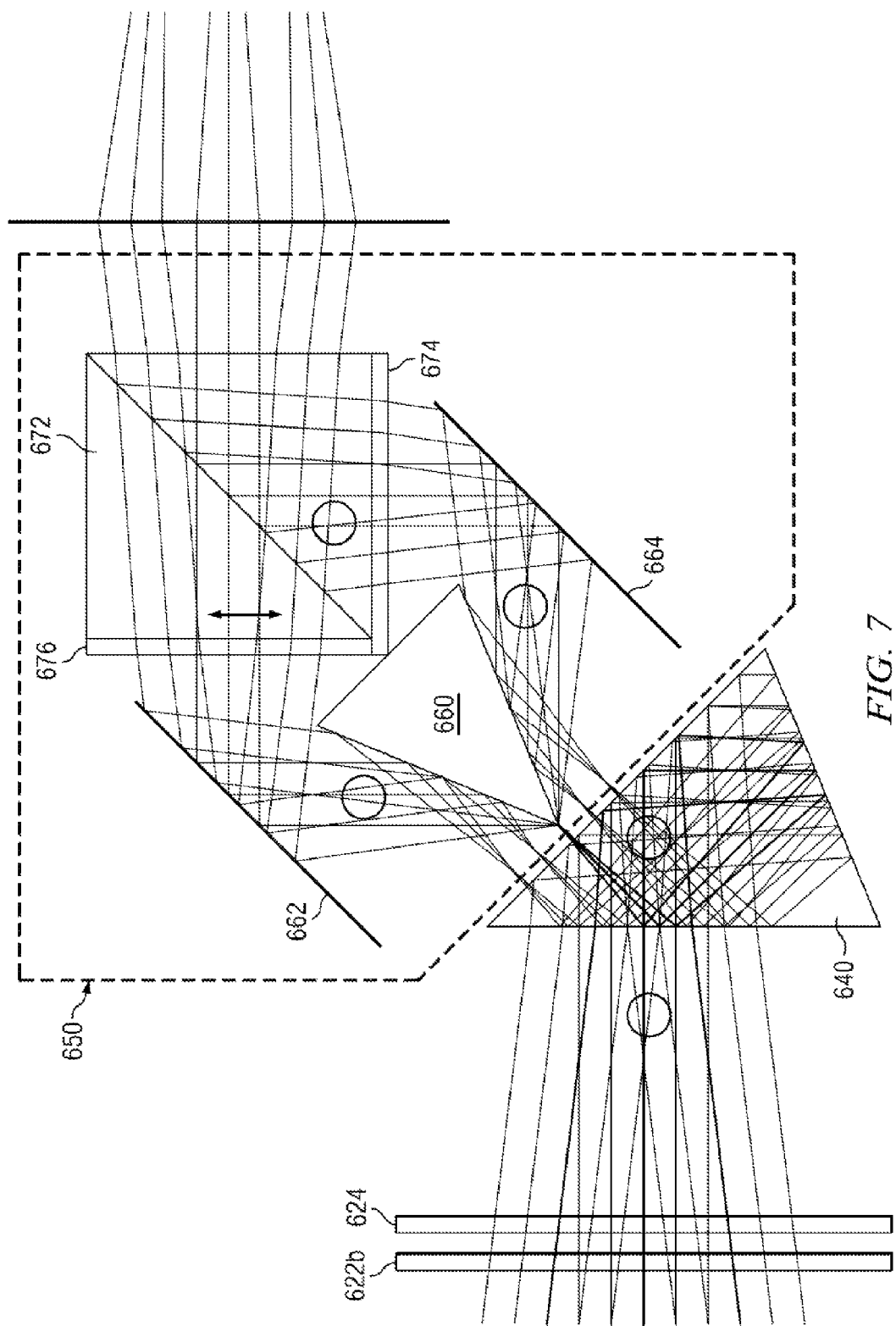
FIG. 7 is a schematic diagram of an enlarged view of the image splitting and combining section of FIG. 6.

FIG. 7 is a schematic ray trace diagram illustrating an enlarged view of the stereoscopic subsystem 650 of FIG. 6. The stereoscopic subsystem 650 includes the mirrored splitting prism 660, mirrors 662, 664, PBS 672, and rotator element 674, as described above with reference to FIG. 6. As shown in this example, the matched waveplate 622*b* and wavelength-selective (or G/M) filter 624 are included after the relay lens 630. Polarized light enters and exits the delta prism 640 with substantially the same polarization. The mirrored prism 660 splits the image, and the two flat mirrors 662, 664 redirect the images to the PBS 672. Prior to the PBS 672, a rotator 674 changes the polarization of one path while an isotropic plate 676 maintains the polarization in the other path. The PBS 672 combines the two paths into one path prior to projection. Again, wobulation may be enabled by rotating the delta prism 640 and/or vibrating the two redirection mirrors 662, 664.

Figure 8:
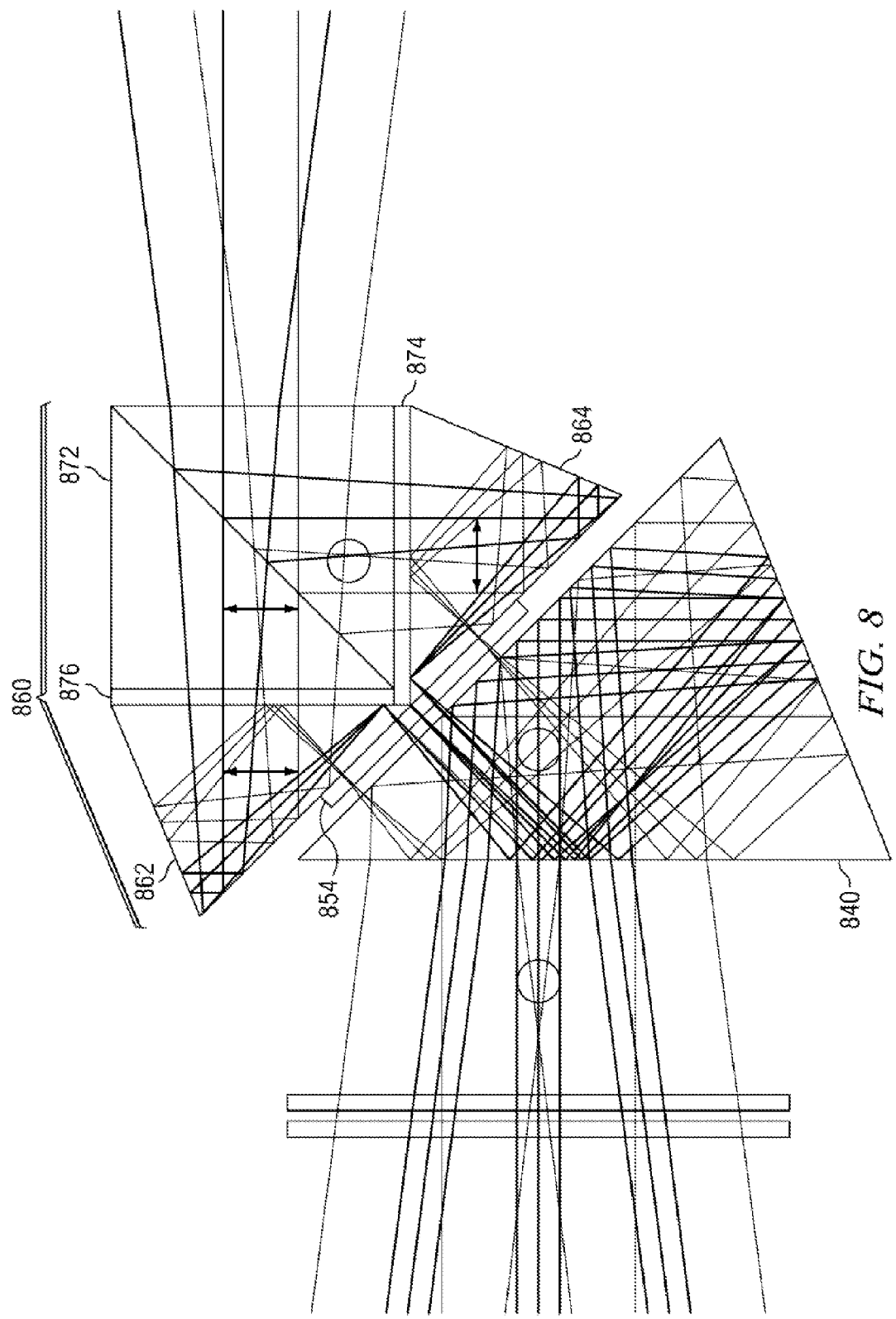
FIG. 8 is a schematic diagram of an enlarged view of another exemplary embodiment of an image splitting and combining section, in accordance with the present disclosure.

FIG. 8 is a schematic diagram of another embodiment of a light directing element 840 and light splitting and combining subsystem 860. Light splitting and combining subsystem 860 may include delta prisms 862, 864, PBS 872, and optional isotropic plate 876 and rotator 874. In this exemplary embodiment, two delta prisms 862, 864 replace the reflective surfaces in the embodiment discussed in relation to FIG. 7 (660, 662, 664). An optional rotator 854 may also be included for compensating skew ray phase differences induced in the sets of delta prisms. Use of the delta prisms 840, 862, 864, as opposed to the redirection mirrors, result in compacting the system. This allows a rotator 854 to be inserted between delta prism 840 and the two following delta prisms 862, 864. A rotator 854 allows for near perfect compensation of phase errors induced by geometry effects of skew rays in the delta prisms 840, 862, 864. Since the prisms all have substantially same geometry relative to the ray paths, a rotator 854 between the prisms will optimally compensate for the skew ray polarization effects. Wobulation, in this case, is enabled by rotating the first delta prism 840 and/or rotating each of the following delta prisms 862, 864.

Figure 9:
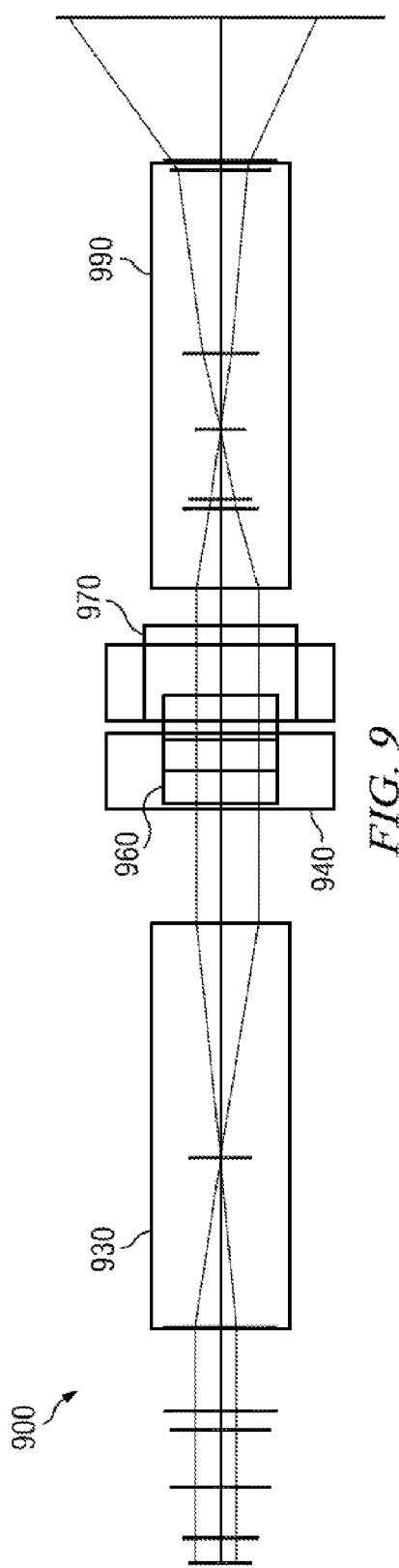
FIG. 9 is a schematic diagram of a top down view of an embodiment of a stereoscopic projection system, in accordance with the present disclosure.

FIG. 9 is a schematic ray trace diagram of a top down view of an embodiment of a stereoscopic projection system 900. This embodiment includes a relay lens 930, light directing element 940, light splitting subsystem 960, light combining subsystem 970, and projection lens 990. The projection lens 990 includes cylindrical elements for enabling anamorphic imaging. Cylindrical elements have been included in the projection lens 990 to produce an anamorphically compressed image at the screen, as disclosed in U.S. Pat. No. 3,658,410 to Willey, which is herein incorporated by reference for all purposes.

Figure 10:
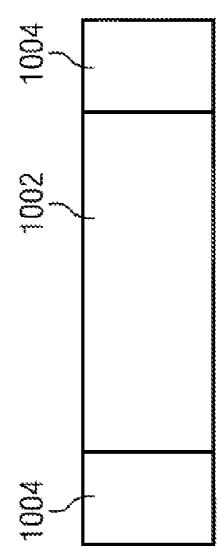
FIG. 10 is an illumination footprint diagram at a screen for a projection lens with and without cylindrical elements, in accordance with the present disclosure.

FIG. 10 is an illumination footprint diagram at the screen for the projection lens with and without the cylindrical elements. Cylindrical elements enable anamorphic functionality. Region 1002 includes anamorphic elements and regions 1004 are without anamorphic elements. In an embodiment, in the case of inclusion of the cylindrical elements, the overall screen brightness is estimated to be approximately 57.5% brighter due to the addition of the anamorphic functionality when compared to the standard projection lens case. The anamorphic elements alter the aspect ratio of the projected image on screen.

Figure 11:
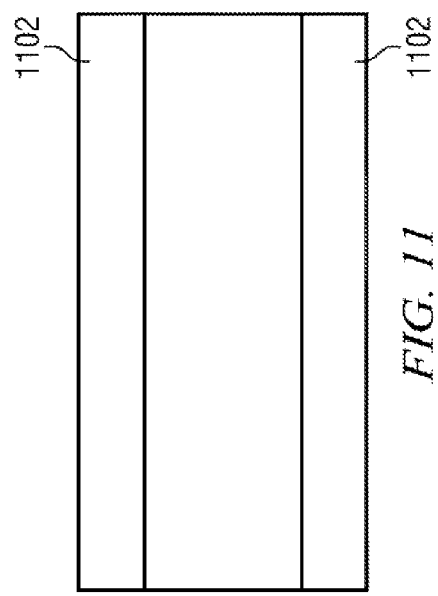
FIG. 11 is a schematic diagram illustrating an alternative technique for enhancing image brightness with cylindrical elements by anamorphically stretching an image to produce a brighter on-screen image, in accordance with the present disclosure.

FIG. 11 is a schematic diagram illustrating an alternative technique for enhancing image brightness with cylindrical elements by anamorphically stretching an image to produce a brighter on-screen image. The image is stretched in the vertical direction to substantially fill the existing screen area. Regions 1102 are the regions of anamorphic stretching. Stretching in the vertical direction allows the same projection lens to be utilized for 2D and 3D presentations.

FIG. 12 is a schematic ray trace diagram illustrating a technique for converting a spatially multiplexed 3D projection system to a non-multiplexed full resolution 2D system. In this exemplary embodiment, the splitting and recombining optics near the aperture stop are removed from the optical path, and the projection lens 1290 is pivoted such that it is parallel with the relay lens 1230 optical axis. The projection lens 1290 may be moved such that the intermediate image 1255 is located near the back focal length of the projection lens 1290. The projection lens 1290 can then be focused and zoomed for proper presentation.

FIG. 13 is a schematic ray trace diagram illustrating another example of a technique for converting the optical system from 3D mode to 2D full resolution mode. In this embodiment, a portion of the splitting and recombining optics are removed (the mirrored prism, mirrors, and PBS) and a 2D bypass subsystem 1380 is inserted into the optical path. In this example, the 2D bypass subsystem 1380 is a second delta prism. The second delta prism 1380, in combination with the first delta prism 1340, vertically shifts the optical axis of the light path coming from the relay lens 1330 to align with the projection lens 1390 optical axis. The projection lens 1390 may move along the optical axis to re-focus the image. The prisms do not have to be delta prisms; rather, prisms or mirrors that redirect the optical axis at approximately 45 degrees may be used. Alternative prisms include the TIR prism type shown in FIG. 16.

FIG. 14 is a schematic ray trace diagram illustrating an embodiment of a system 1400 with an external anamorphic converter lens 1495 located in the light path after the projection lens 1490, see, e.g., U.S. Pat. No. 5,930,050 to Dewald (the magnification in FIG. 14 has opposite polarity to Dewald).

FIG. 15 is a schematic ray trace diagram illustrating another embodiment of a system 1500 with an external anamorphic converter lens 1595. As shown, for 3D operation, the anamorphic converter 1595 (i.e. an anamorphic afocal converter) is put in place after the projection lens 1590 to produce a brighter 3D image from the multiplexed panel. For 2D full resolution operation, the anamorphic converter 1595 may be removed from the optical path to allow the non-multiplexed full 2D panel resolution to be presented without anamorphic distortion. FIG. 14 depicts an anamorphic converter with magnification 0.5× in the horizontal direction, while FIG. 15 depicts an anamorphic converter with magnification 2× in the vertical direction.

Figure 16:
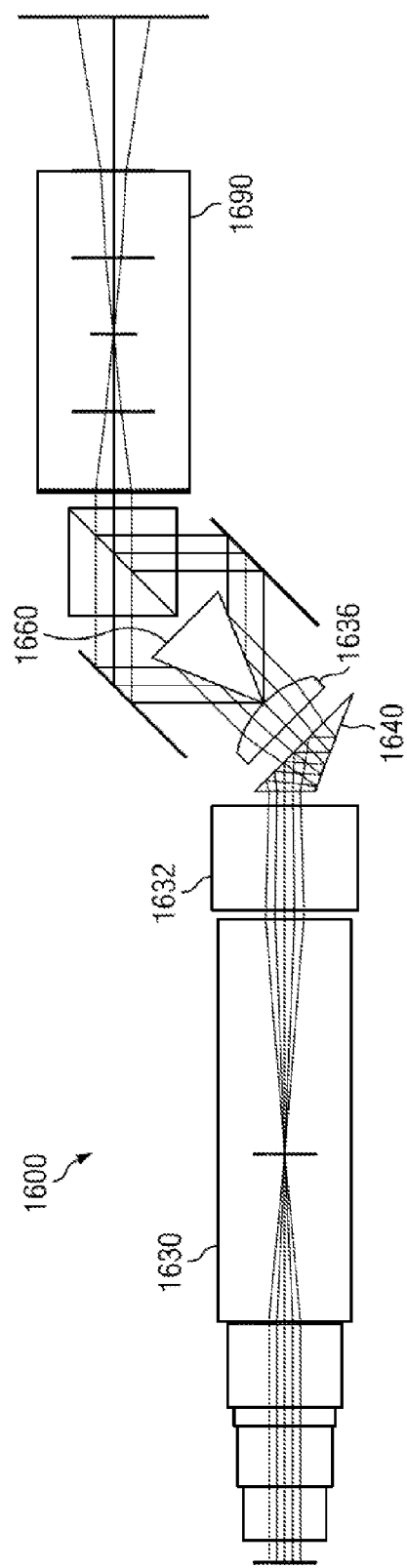
FIG. 16 is a schematic diagram illustrating another embodiment of a stereoscopic projection system, in accordance with the present disclosure.

FIG. 16 is a schematic ray trace diagram illustrating another embodiment of a stereoscopic projection system 1600. System 1600 further includes a Bravais subsystem 1632 implemented at the output of the relay lens 1630 and prior to the image splitting subsystem 1660. The TIR prism 1640 has been changed to accommodate the non-telecentric ray bundles emerging from the Bravais 1632. An optional cylindrical field lens 1636 is also shown for creating telecentric bundles, should a telecentric projection lens be used. The anamorphic stretch has been implemented in the vertical direction, allowing the same projection lens 1690 to be utilized for both 2D and 3D presentations with little or no change in projection lens zoom setting.

Bravais optical systems have been utilized to provide anamorphic stretch or compression along one direction of an image as disclosed by W. Smith in *Modern Optical Engineering*, p. 272, McGraw-Hill 1990 (describing the use of Bravais optics in motion pictures work), which is herein incorporated by reference for all purposes. Bravais systems comprise a positive and negative cylindrical element separated by a finite distance and located in the finite conjugate of a lens system.

A Bravais system might be inserted near the panel, close to the relay lens output, or close to the projection lens input. The polarization and color management optics make inserting Bravais optics near the panel difficult. The Bravais system shortens the projection lens back focal length (BFL), and a long BFL is preferred for inserting the PBS, splitting prism, and mirrors.

Figure 17:
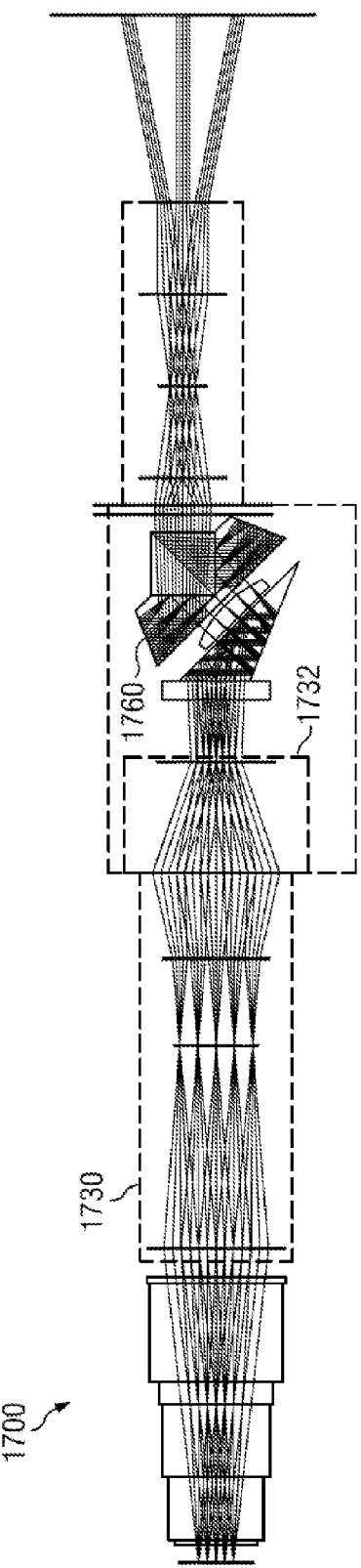
FIG. 17 is a schematic diagram illustrating another embodiment of a stereoscopic projection system, in accordance with the present disclosure.

FIG. 17 is a schematic ray trace diagram illustrating another embodiment of a stereoscopic projection system 1700 that is similar to the embodiment shown in FIG. 16, with a difference being that the mirrored prism and folding mirrors have been replaced with more compact delta prisms 1760. System 1700 also includes a Bravais subsystem 1732 implemented at the output of the relay lens 1730.

Figure 18:
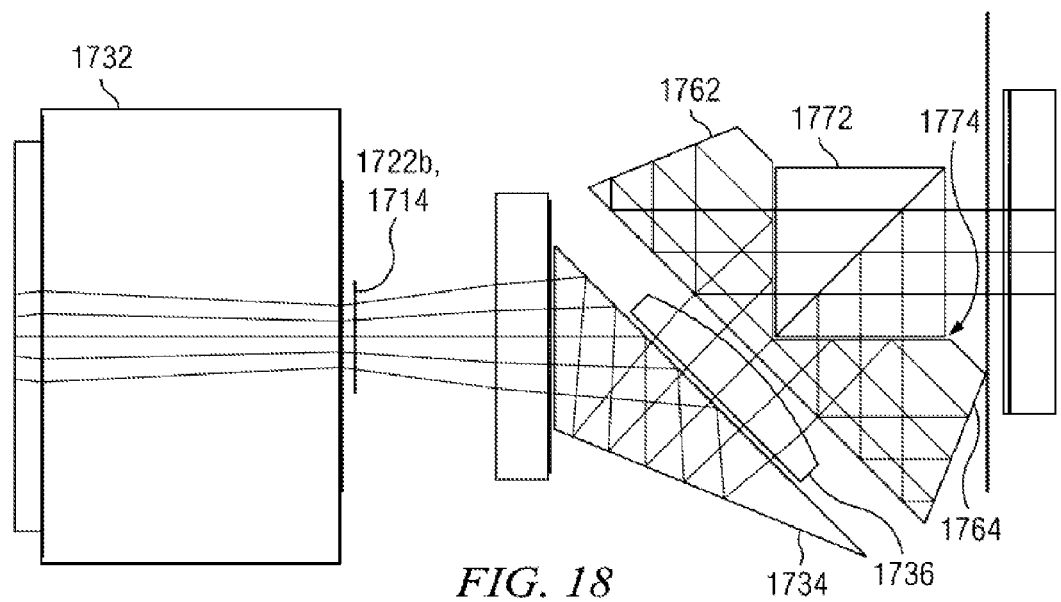
FIG. 18 is a close-up view of the image splitting and combining assembly in FIG. 17.

FIG. 18 is a close-up view of the image splitting and combining assembly in FIG. 17, specifically showing a close-up view of the paraxial Bravais system 1732, filter 1714, field lens 1736, and prisms 1764, 1762. The Bravais anamorphic lens 1732 (depicted as a paraxial lens) follows the relay lens. A matched quarter-wave plate 1722b and wavelength-selective filter 1714 follow the Bravais 1732. A TIR turning prism 1734 is next, followed by a cylindrical field lens 1736 to provide for telecentricity at the intermediate image. Two modified delta prisms 1762, 1764 follow the cylindrical field lens 1736. The delta prisms 1762, 1764 have cut corners near the intermediate image to facilitate image splitting while maintaining clear aperture through the prism for the marginal rays. A PBS 1772 follows the two delta prisms and combines the images. A rotator 1774 is included in one of the optical paths after the delta prisms, and optional cleanup polarizers (not shown) may also be implemented between the delta 1762, 1764 and PBS 1774. The entire assembly is compact and affords a small back focal length in the projection lens. This aids in reducing cost and/or improving performance of the projection lens.

Figure 19:
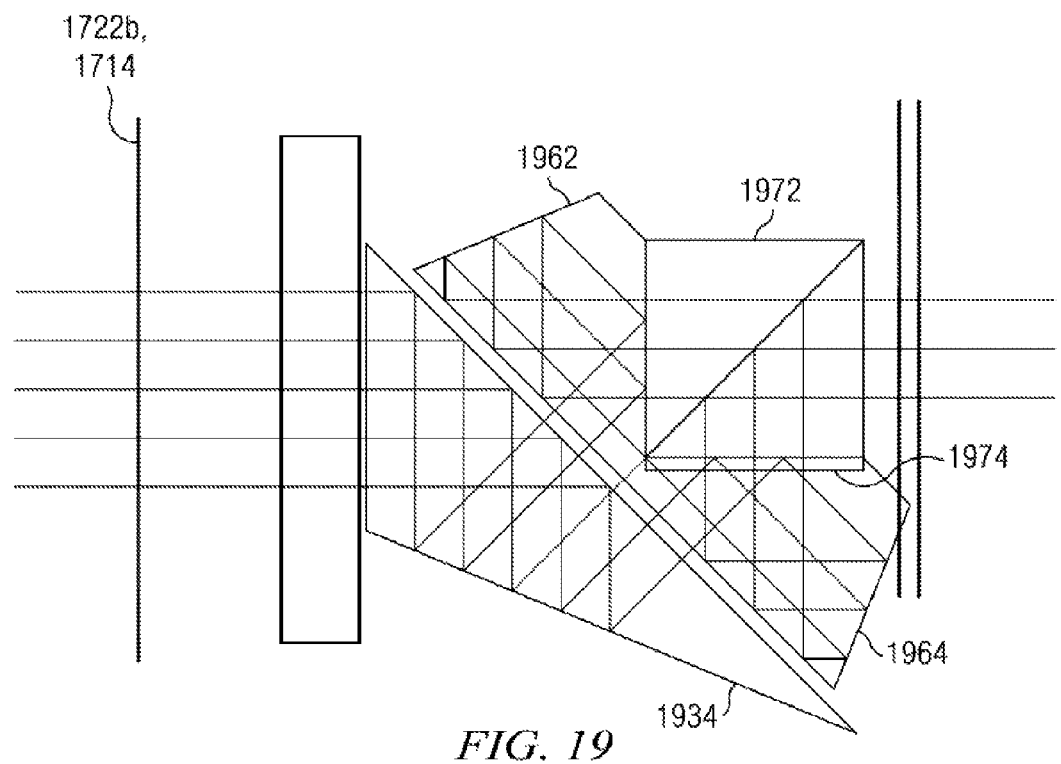
FIG. 19 is a schematic diagram of an enlarged view of another exemplary embodiment of an image splitting and combining section, in accordance with the present disclosure.

FIG. 19 is a close-up view of another image combining assembly that is similar to the embodiment shown in FIG. 18, but is adapted for non-anamorphic systems (i.e. systems without the Bravais anamorphic lens). This embodiment includes filter 1914, matched quarter-wave plate 1922b, TIR prism 1934, prisms 1964, 1962, PBS 1972, and rotator 1774. In this embodiment, the cylindrical field lens 1736 of FIG. 17 is not included, and may be utilized in non-anamorphic systems (i.e. systems without the Bravais anamorphic lens).

Figure 20:
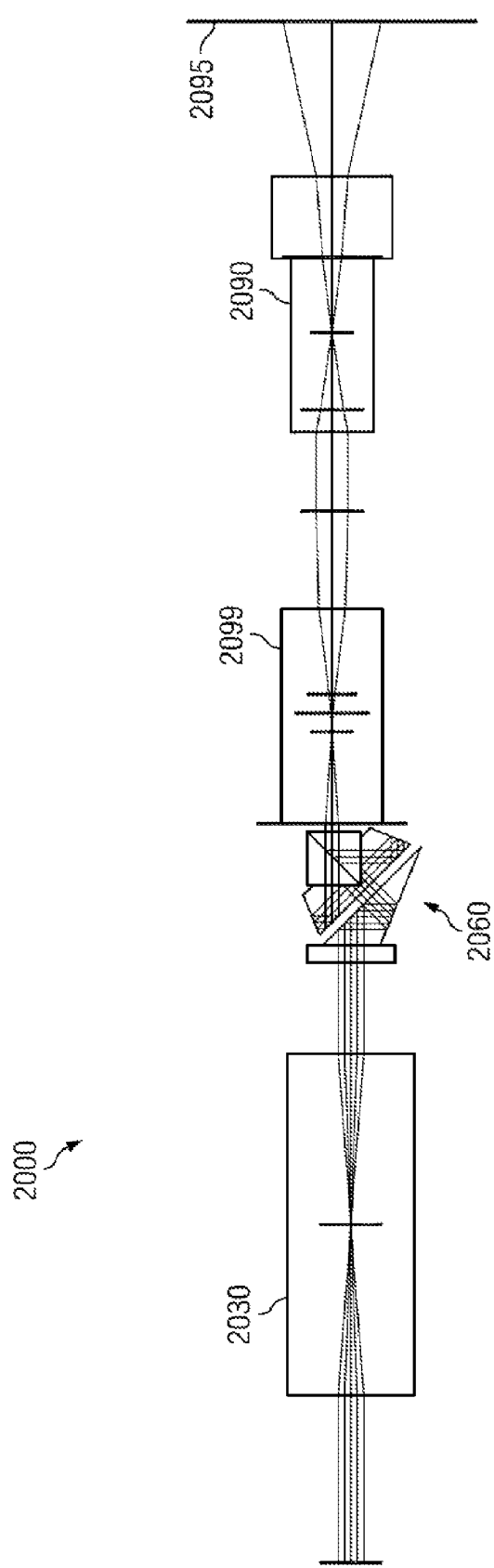
FIG. 20 is a schematic diagram illustrating another embodiment of a stereoscopic projection system, in accordance with the present disclosure.

FIG. 20 is a schematic ray trace diagram illustrating another embodiment of a 3D lens system 2000. In this embodiment, an anamorphic telecentric relay lens 2099 is inserted between the standard relay lens 2030 and the projection lens 2090. The anamorphic relay lens 2099 creates a real image of the intermediate image produced by the standard relay lens 2030. The projection lens 2090 then projects an image of the anamophic relay lens's 2099 image onto the screen 2095.

In this embodiment, the anamorphic telecentric relay lens 2099 may be a telecentric relay lens with an afocal anamorphic converter located near its aperture stop. The afocal anamorphic converter may be an afocal converter implemented with cylindrical lenses. The cylindrical lenses may change the magnification of the relay in one aspect (e.g. 2× magnification vertically) while having a unity magnification in the orthogonal aspect (e.g. 1× magnification horizontally). In any of the anamorphic implementations, the magnification in each aspect may be different to be considered anamorphic (i.e. the aspects can be magnifications other than unity magnification). If both aspects have magnification not equal to 1, then toric elements are desirable in the converter, or multiple cylindrical elements which have orthogonal axes of rotation may be used. The anamorphic relay is preferably telecentric to maintain light throughput and contrast. The telecentric anamorphic relay lens 2099 is shown between the prism assembly 2060 and projection lens 2090 in this exemplary embodiment, but it may also be implemented between the standard relay lens 2030 and prism assembly 2060.

Note that in this embodiment a cylindrical field lens is not included at the first intermediate image. When the anamorphic converter is placed near the aperture stop of a lens, it is operating on collimated beams, an advantage in terms of aberration correction. Telecentricity can thus be maintained without the use of a field lens. Additionally, the anamorphic converter may be implemented near the aperture stop of the first relay lens or the projection lens, moving the anamorphic function to one of those locations, which may allow for the lack of the anamorphic telecentric relay. An advantage of a system utilizing the anamorphic telecentric relay is that the anamorphic telecentric relay may be removed, and the system may operate with equal magnification in all directions (e.g. for 2D presentation using the full panel resolution). U.S. Pat. No. 6,995,920 describes a telecentric anamorphic relay lens for use with camera (image taking) lenses, and is herein incorporated by reference.

It should be appreciated that a Bravais anamorphic lens may be added to the various embodiments disclosed herein in order to improve the lumen output of the system. The Bravais can be placed after the relay lens and before the splitting prisms. The Bravais magnifies the intermediate image by 2× in the vertical direction and 1× in the horizontal direction, allowing the full panel size to be utilized in 3D mode. If the Bravais is removed, and the splitting prisms and projection lenses are translated vertically such that the entire intermediate image passes through a single TIR prism and single projection lens, the full resolution image from the panel can be utilized for 2D presentations.

Additionally, it should be appreciated that external anamorphic afocal converters may be applied to the various embodiments disclosed herein in order to improve the lumen output of the system. Such external anamorphic converters can be located after the projection lenses. Alternatively, the projection lenses themselves may be made anamorphic (e.g. as a single projection lens is made anamorphic in U.S. Pat. No. 5,930,050, herein incorporated by reference) to improve the lumen output.

While various embodiments in accordance with the disclosed principles have been described above, it should be understood that they have been presented by way of example only, and are not limiting. Thus, the breadth and scope of the invention(s) should not be limited by any of the above-described exemplary embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 C.F.R. 1.77 or otherwise to provide organizational cues. These headings shall not limit or characterize the invention(s) set out in any claims that may issue from this disclosure. Specifically and by way of example, although the headings refer to a "Technical Field," such claims should not be limited by the language chosen under this heading to describe the so-called technical field. Further, a description of a technology in the "Background" is not to be construed as an admission that technology is prior art to any invention(s) in this disclosure. Neither is the "Summary" to be considered as a characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings herein.

What is claimed is:

1. A stereoscopic projection system, comprising:
    a relay lens subsystem operable to receive a stereoscopic image frame from an input light path and convey the stereoscopic image frame to an intermediate image plane, the stereoscopic image frame having first image area light and second image area light;
    a light splitting subsystem operable to receive the stereoscopic image frame at the intermediate image plane and split the first image area light from the second image area light, to direct the first image area light on a first image light path, and to direct the second image area light on a second image light path;
    a light combining subsystem operable to combine the first and second image area light, wherein the first image area light that is output from the light combining subsystem has a polarization state orthogonal to the second image area light; and
    a projection lens subsystem operable to direct the first and second image area light toward a screen,
    wherein one of the relay lens subsystem and the projection lens subsystem is anamorphic.

2. The stereoscopic projection system of claim 1, wherein the relay lens subsystem is anamorphic, and wherein the anamorphic relay lens subsystem comprises an anamorphic relay lens.

3. The stereoscopic projection system of claim 1, wherein the relay lens subsystem is anamorphic, and wherein the anamorphic relay lens subsystem comprises a relay lens and an anamorphic relay lens.

4. The stereoscopic projection system of claim 3, wherein the anamorphic relay lens comprises an anamorphic telecentric relay lens.

5. The stereoscopic projection system of claim 3, wherein the relay lens is operable to receive the stereoscopic image frame from the input light path and convey the stereoscopic image frame to the intermediate image plane, and
    wherein the anamorphic relay lens is operable to receive the first and second image area light from the light combining subsystem and convey the first and second image area light to the projection lens subsystem.

6. The stereoscopic projection system of claim 3, wherein the anamorphic relay lens is operable to receive the stereoscopic image frame from the relay lens and convey the stereoscopic image frame to the intermediate image plane.

7. The stereoscopic projection system of claim 1, wherein the projection lens subsystem is anamorphic, and wherein the anamorphic projection lens subsystem comprises an anamorphic projection lens.

8. The stereoscopic projection system of claim 1, wherein the projection lens subsystem is anamorphic, and wherein the anamorphic projection lens subsystem comprises a projection lens and an anamorphic converter lens.

9. The stereoscopic projection system of claim 1, wherein the light combining subsystem comprises a polarization beam splitter (PBS).

10. The stereoscopic projection system of claim 1, wherein the projection lens subsystem comprises a single projection lens.

11. The stereoscopic projection system of claim 1, further comprising a liquid crystal (LC) projector.

12. The stereoscopic projection system of claim 11, further comprising a matched waveplate located on the input light path before the relay lens subsystem, the matched waveplate being substantially dispersion matched to a waveplate within the LC projector.

13. The stereoscopic projection system of claim 11, further comprising a matched waveplate located on the intermediate light path after the relay lens subsystem, the matched waveplate being substantially dispersion matched to a waveplate within the LC projector.

14. The stereoscopic projection system of claim 1, further comprising:
    a wavelength selective polarization filter located on one of the input light path and intermediate light path.

15. The stereoscopic projection system of claim 1, further comprising a quarter wave plate located on an output light path.

16. The stereoscopic projection system of claim 1, wherein the light splitting subsystem comprises first and second mirrors.

17. The stereoscopic projection system of claim 1, wherein the light splitting subsystem comprises one of a total internal reflection prism, a mirrored prism, and a pair of total internal reflection prisms.

18. The stereoscopic projection system of claim 1, wherein the projection lens subsystem comprises a polarization beam splitter (PBS) and a single projection lens;
    wherein the PBS is operable to combine the first and second image area light;
    wherein the single projection lens is operable to project the combined first and second image area light toward the screen; and
    wherein the first and second image area light substantially overlap on the screen.

19. The stereoscopic projection system of claim 1, wherein the stereoscopic image frame is conveyed to the intermediate image plane via a light directing element.

20. The stereoscopic projection system of claim 19, wherein the light directing element comprises one of a mirror and a prism.

21. A projection system operable to selectively project stereoscopic and non-stereoscopic projection modes, comprising:
a relay lens subsystem operable to receive input light from an image subsystem and convey the input light toward an intermediate light path;
a stereoscopic module operable to receive the light from the intermediate light path and process the light for stereoscopic projection of left and right eye images having orthogonal polarization states;
a non-stereoscopic module operable to receive the light from the intermediate light path;
a projection lens subsystem operable to focus light from the stereoscopic module or the non-stereoscopic module toward a screen; and
wherein one of the relay lens subsystem and the projection lens subsystem is anamorphic, and
wherein when in a stereoscopic projection mode, the stereoscopic module is located in the intermediate light path, and wherein when in a non-stereoscopic projection mode, the non-stereoscopic module is located in the intermediate light path.

22. The projection system of claim 21, wherein the relay lens subsystem is anamorphic, and wherein the anamorphic relay lens subsystem comprises an anamorphic relay lens.

23. The stereoscopic projection system of claim 21, wherein the relay lens subsystem is anamorphic, and wherein the anamorphic relay lens subsystem comprises a relay lens and an anamorphic relay lens.

24. The stereoscopic projection system of claim 23, wherein the anamorphic relay lens comprises an anamorphic telecentric relay lens.

25. The stereoscopic projection system of claim 23, wherein the relay lens is operable to receive the input light from the image subsystem and convey the input light toward the intermediate light path, and
wherein the anamorphic relay lens is operable to convey light from the stereoscopic module or the non-stereoscopic module to the projection lens subsystem.

26. The stereoscopic projection system of claim 23, wherein the anamorphic relay lens is operable to receive the input light from the relay lens and convey the input light to the intermediate light path.

27. The stereoscopic projection system of claim 21, wherein the projection lens subsystem is anamorphic, and wherein the anamorphic projection lens subsystem comprises an anamorphic projection lens.

28. The stereoscopic projection system of claim 21, wherein the projection lens subsystem is anamorphic, and wherein the anamorphic projection lens subsystem comprises a projection lens and an anamorphic converter lens.

29. The projection system of claim 21, further comprising a selector for selecting between the stereoscopic mode and the non-stereoscopic mode.

30. The projection system of claim 21, further comprising a mechanism operable to selectively locate the stereoscopic module into the intermediate light path when in the stereoscopic mode, and locate the non-stereoscopic module into the intermediate light path when in the non-stereoscopic mode.

31. The projection system of claim 30, further comprising an actuator operable to move the mechanism between the stereoscopic mode and the non-stereoscopic mode.

32. The projection system of claim 21, further comprising a light directing element located after the relay lens subsystem, operable to direct light toward on the intermediate light path.

33. The projection system of claim 32, wherein the light directing element is selected from the group comprising a mirror, and a prism.

34. The projection system of claim 21, wherein the stereoscopic module comprises:
a light splitting subsystem operable to:
receive a stereoscopic image frame having first and second image area light at an intermediate image plane,
split the first image area light from the second image area light,
to direct the first image area light on a first image light path, and
to direct the second image area light on a second image light path; and
a light combining subsystem operable to combine the first and second image area light, wherein the first image area light that is output from the light combining subsystem has a polarization state orthogonal to the second image area light.

35. The stereoscopic projection system of claim 21, further comprising a liquid crystal (LC) projector.

36. The stereoscopic projection system of claim 21, further comprising a quarter wave plate located on an output light path.

* * * * *